(12) United States Patent
Adams et al.

(10) Patent No.: US 8,571,350 B2
(45) Date of Patent: Oct. 29, 2013

(54) IMAGE PROCESSING SYSTEM WITH IMAGE ALIGNMENT MECHANISM AND METHOD OF OPERATION THEREOF

(75) Inventors: Dennis Adams, Madison, WI (US); Dale Emmons, Madison, WI (US)

(73) Assignee: Sony Corporation, Tokyo (JP)

( * ) Notice: Subject to any disclaimer, the term of this patent is extended or adjusted under 35 U.S.C. 154(b) by 321 days.

(21) Appl. No.: 13/030,124

(22) Filed: Feb. 17, 2011

(65) Prior Publication Data

US 2012/0051665 A1    Mar. 1, 2012

Related U.S. Application Data

(60) Provisional application No. 61/377,266, filed on Aug. 26, 2010, provisional application No. 61/412,378, filed on Nov. 10, 2010.

(51) Int. Cl.
| | |
|---|---|
| *G06K 9/36* | (2006.01) |
| *G06K 9/68* | (2006.01) |
| *G06K 15/00* | (2006.01) |
| *H04N 1/04* | (2006.01) |

(52) U.S. Cl.
USPC ............ 382/287; 382/218; 250/557; 358/488

(58) Field of Classification Search
None
See application file for complete search history.

(56) References Cited

U.S. PATENT DOCUMENTS

| 6,831,677 B2 | 12/2004 | Peleg et al. |
|---|---|---|
| 7,538,876 B2 | 5/2009 | Hewitt et al. |
| 2006/0023197 A1 | 2/2006 | Joel |
| 2007/0047818 A1 | 3/2007 | Hull et al. |
| 2008/0117290 A1 | 5/2008 | Mazza |
| 2009/0128621 A1 | 5/2009 | Passmore et al. |
| 2010/0046859 A1 | 2/2010 | Hitomi et al. |
| 2010/0103248 A1 | 4/2010 | Farnik |
| 2010/0157070 A1 | 6/2010 | Mohanty et al. |
| 2010/0166323 A1* | 7/2010 | Zhao et al. ................... 382/218 |

OTHER PUBLICATIONS

International Search Report for Application No. PCT/US11/48765 dated Jan. 10, 2012.
Gerhard P. Herbig, "Cosima: Correct Stereo Images Automatically", Nov. 2008 www.herbig-3d.de.
Chen et al., "Automatic Alignment Of High-Resolution Multi-Projector Display Using an Un-Calibrated Camera", 2000, Publisher: Department of Computer Science, Princeton University http://www.cs.princeton.edu/omnimedia/papers/vis2000_paper.pdf.

* cited by examiner

*Primary Examiner* — Randolph I Chu
(74) *Attorney, Agent, or Firm* — Ishimaru & Associates LLP

(57) ABSTRACT

A method of operation of an image processing system includes: identifying a feature point on a first image; determining a matching point on a second image with the matching point corresponding to the feature point; calculating an offset component between the feature point and the matching point with the offset component having a vertical offset; identifying a correction field for updating the first image and the second image, with the correction field having a vertical adjustment, a zoom adjustment, a rotational adjustment, and a keystone adjustment; and updating the first image and the second image using the correction field for minimizing the offset component for displaying an aligned image on a device.

14 Claims, 7 Drawing Sheets

IMAGE PROCESSING SYSTEM WITH IMAGE ALIGNMENT MECHANISM AND METHOD OF OPERATION THEREOF

CROSS-REFERENCE TO RELATED APPLICATION(S)

This application claims the benefit of U.S. Provisional Patent Application Ser. No. 61/377,266 filed Aug. 26, 2010, and U.S. Provisional Patent Application Ser. No. 61/412,378 filed Nov. 10, 2010, and the subject matter thereof is incorporated herein by reference thereto.

TECHNICAL FIELD

The present invention relates generally to an image processing system, and more particularly to an image processing system for aligning stereoscopic images.

BACKGROUND ART

Advances in computer processor speed and memory are providing increasing functionality and strength to support modern life, including capturing, storing, and processing images. Research and development in the existing technologies can take a myriad of different directions.

One resulting technology is to combine multiple images of the same target to create a continuous visual representation of the target, such as in panoramic photographs or three-dimensional depictions. However, the tools available are often not efficient in properly aligning the multiple images.

The need to reduce costs, improve efficiencies and performance, and meet competitive pressures adds an even greater urgency to the critical necessity for finding answers to these problems. However, solutions to these problems have been long sought but prior developments have not taught or suggested any solutions and, thus, solutions to these problems have long eluded those skilled in the art. Thus, a need still remains for an image processing system with image alignment mechanism.

DISCLOSURE OF THE INVENTION

The present invention provides a method of operation of an image processing including: identifying a feature point on a first image; determining a matching point on a second image with the matching point corresponding to the feature point; calculating an offset component between the feature point and the matching point with the offset component having a vertical offset; identifying a correction field for updating the first image and the second image, with the correction field having a vertical adjustment, a zoom adjustment, a rotational adjustment, and a keystone adjustment; and updating the first image and the second image using the correction field for minimizing the offset component for displaying an aligned image on a device.

The present invention provides an image processing system including: a feature module for identifying a feature point on a first image; a matching module, coupled to the feature module, for determining a matching point on a second image, with the matching point corresponding to the feature point; an offset calculation module, coupled to the matching module, for calculating an offset component between the feature point and the matching point, with the offset component having a vertical offset; a field identification module, coupled to the offset calculation module, for identifying a correction field for adjusting the first image and the second image, with the correction field having a vertical adjustment, a zoom adjustment, a rotational adjustment, a keystone adjustment, or a combination thereof; and an image update module, coupled to the field identification module, for updating the first image and the second image for minimizing the offset component for displaying an aligned image on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
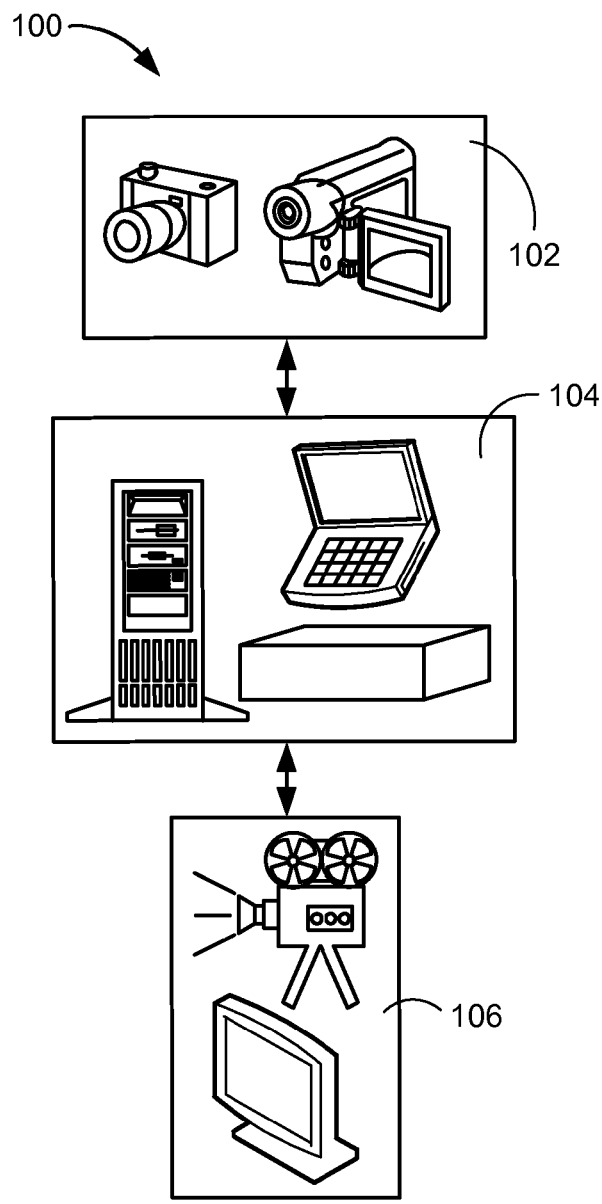
FIG. 1 is an image processing system with image alignment mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

For expository purposes, the term "horizontal" as used herein is defined as the horizontal direction when seen viewing the drawing as indicated by the figure designation of "FIG.". The term "vertical" refers to a direction perpendicular to the horizontal as just defined. Terms, such as "above", "below", "bottom", "top", "side", "higher", "lower", "upper", "over", and "under", are defined with respect to the horizontal, as shown in the figures. Generally, the invention can be operated in any orientation.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a camera, a camcorder, a microelectromechanical system, passive devices, or a combination thereof.

The term "image data" referred to herein can include digital or analog visual representation of an object. For example, digital visual representation can be a digital photograph, short-clip, movie, or a combination thereof. Also, for example, analog visual representation can be developed pictures, films, negatives, or a combination thereof containing a visual representation.

It is understood that the "pixel location" or generally a location of a particular point in the image data can take many formats. For example, the location can be described using the Cartesian coordinate system, with the origin (0, 0) at the lower left corner, upper left corner, or the center of the image data, or using the polar coordinate system. Also, for example, the location can be described using the pixel number, such as 12 or (2, 511), or using the physical distance away from the origin, such as 2 millimeter or 0.5 inches.

For illustrative purposes, the various locations within the image data will be described using the Cartesian coordinate system, with the origin under the left most location and at the same height as the bottom most location of the image data. Each increment of the coordinate system will denote a pixel. For example, (1, 0) can denote the pixel immediately to the right of the origin and (0, 1) can denote the pixel immediately above the origin. However, it is understood that the location within the image data can be described in numerous different ways as discussed above.

Referring now to FIG. 1, therein is shown an image processing system 100 with image alignment mechanism in an embodiment of the present invention. The image processing system 100 can include a capturing device 102 interfacing with an image adjustor 104. The image adjustor 104 can interface with a viewing device 106.

The capturing device 102 is a device that can capture a photographic or a video image. The capturing device 102 can be variety of different devices. For example, the capturing device 102 can include a digital or analog camera, camcorder, and cellular phone with image capturing means. The capturing device 102 can also be a set of Three-Dimensional (3D) cameras used for capturing 3D images.

The image adjustor 104 is a device or module that can adjust and update the images captured by the capturing device 102. For example, the image adjustor 104 can be a computer software on a post-processing computer that can edit the captured images or a stand-alone device that can align the left-right images from a 3D camera. The details of adjusting and updating function of the image adjustor 104 will be discussed below.

The viewing device 106 is a device that can display the images that have been updated by the image adjustor 104. For example, the viewing device 106 can be a television, a computer screen, a display interface on a cellular phone, or a 3D movie projector.

For illustrative purposes, the image processing system 100 is shown as having the capturing device 102, the image adjustor 104, and the viewing device 106 as physically separate devices. However, it is understood that the image processing system 100 can be different. For example, the image processing system 100 can be a single device, such as a laptop computer or a cellular phone that has a camera, an image processing software, a hard drive, and a screen. Also, for example, the image processing system 100 can be partitioned differently, such as a computer having camera, a hard drive, and a screen, interfacing with a stand-alone image-adjusting device.

Figure 2:
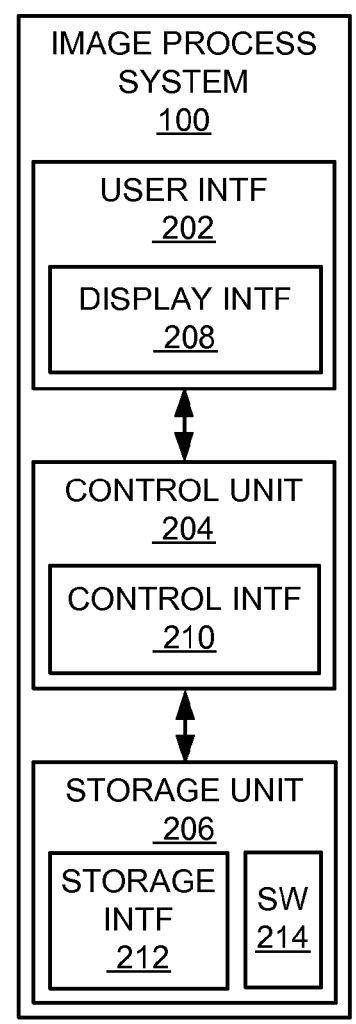
FIG. 2 is an exemplary block diagram of the image processing system.

Referring now to FIG. 2, therein is shown an exemplary block diagram of the image processing system 100. The image processing system 100 can include a user interface 202, a control unit 204, and a storage unit 206. The user interface 202 can include a display interface 208. The control unit 204 can include a control interface 210. The storage unit can include a storage interface 212.

The user interface 202 allows a user to interface and interact with the image processing system 100. The user interface 202 can include an input device and an output device. Examples of the input device of the user interface 202 can include a keypad, a touchpad, soft-keys, a keyboard, a microphone, or a combination thereof to provide data and communication inputs.

The user interface 202 can include the display interface 208. Examples of the output device of the user interface 202 can include the display interface 208. The display interface 208 can include a display, a projector, a video screen, a speaker, or a combination thereof.

The control unit 204 can execute a software 214 to provide the intelligence of the image processing system 100. The control unit 204 can operate the user interface 202 to display information generated by the image processing system 100. The control unit 204 can also execute the software 214 for the other functions of the image processing system 100, including receiving image information from the capturing device 102 of FIG. 1. The control unit 204 can further execute the software 214 for adjusting and updating the image information to display on or through the viewing device 106 of FIG. 1.

The control unit 204 can be implemented in a number of different manners. For example, the control unit 204 can be a processor, an embedded processor, a microprocessor, a hardware control logic, a hardware finite state machine, a digital signal processor, or a combination thereof.

The control unit 204 can include the control interface 210. The control interface 210 can be used for communication between the control unit 204 and other functional units in the image processing system 100. The control interface 210 can also be used for communication that is external to the image processing system 100.

The control interface 210 can receive information from the other functional units or from external sources, or can transmit information to the other functional units or to external destinations. The external sources and the external destinations refer to sources and destinations external to the image processing system 100.

The control interface 210 can be implemented in different ways and can include different implementations depending on which functional units or external units are interfacing with the control interface 210. For example, the control interface 210 can be implemented with a pressure sensor, an inertial sensor, a microelectromechanical system, optical circuitry, waveguides, wireless circuitry, wireline circuitry, or a combination thereof.

The storage unit 206 can store the software 214. The storage unit 206 can also store the relevant information, such as advertisements, preferred settings, operating system, previous adjustments and updates, or a combination thereof.

The storage unit 206 can be a volatile memory, a nonvolatile memory, an internal memory, an external memory, or a combination thereof. For example, the storage unit 206 can be a nonvolatile storage such as non-volatile random access memory, Flash memory, disk storage, or a volatile storage such as static random access memory.

The storage unit 206 can include the storage interface 212. The storage interface 212 can be used for communication between the control unit 204 and other functional units in the image processing system 100. The storage interface 212 can also be used for communication that is external to the image processing system 100.

The storage interface 212 can receive information from the other functional units or from external sources, or can transmit information to the other functional units or to external destinations. The external sources and the external destinations referred to as sources and destinations external to the image processing system 100.

The storage interface 212 can be implemented differently depending on which functional units or external units are being interfaced with the storage unit 206. The storage interface 212 can be implemented with technologies and techniques similar to the implementation of the control interface 210.

Figure 3:
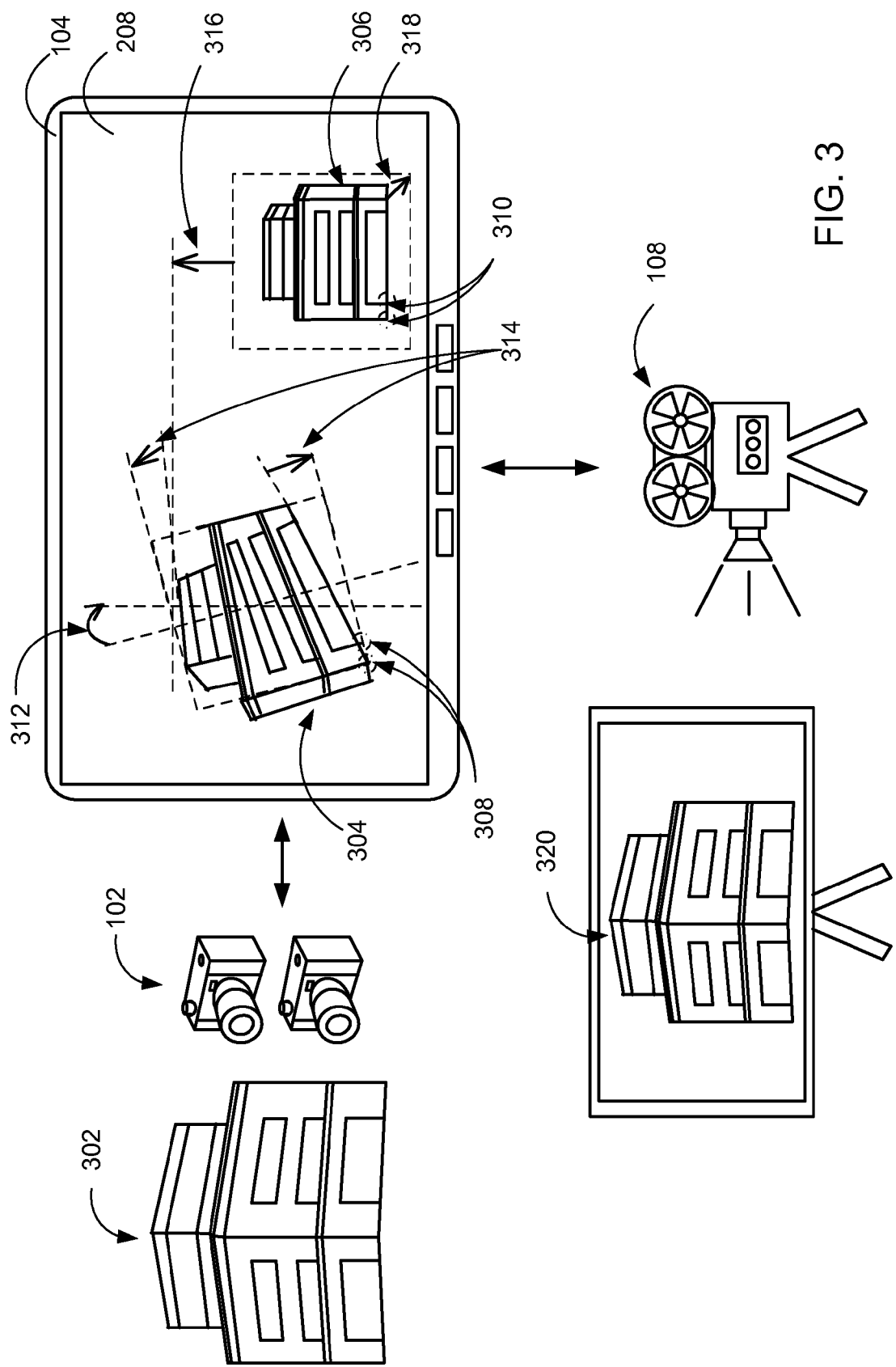
FIG. 3 is an example of an operation of the image processing system.

Referring now to FIG. 3, therein is shown an example of an operation of the image processing system 100 of FIG. 1. The image processing system 100 is shown capturing the image data of a target 302. The target 302 is the person, place, object, or a combination thereof that the image processing system 100 is or has visually captured. For example, the target 302 can be a building or moving scenery that is being captured or has been captured into image data through the capturing device 102.

The captured image data can be represented as a first image 304 and a second image 306 on the display interface 208. For brevity of description in this embodiment of the present invention, the display interface 208 will be described as part of the image adjustor 104. However, it is understood that the screen shot shown on the display interface 208 can represent the screen shot for the image processing system 100.

The first image 304 is the image data of the target 302. The second image 306 is the image data of the target 302 taken from a different location than where the first image 304 was taken. For example, the first image 304 can be the image data from the left camera and the second image 306 can be the image data from the right camera in Three-Dimensional (3D) filming applications. Also, for example, the first image 304 can capture one portion of the target 302 and the second image 306 can be the adjacent portion of the target 302 in panoramic pictures.

The first image 304 can include a feature point 308. The feature point 308 is a portion within the first image 304 that is different in color, shade, shape, or a combination thereof from the surrounding portions. The feature point 308 can be distinct in multiple ways. For example, the feature point 308 can be a unique point, such as a corner, an apex, or an intersecting point of the target 302 as represented in the first image 304. Also, for example, the feature point 308 can be a portion within the first image 304 having a unique color or a distinguishable line or edge.

The second image 306 can include a matching point 310. The matching point 310 is a portion within the second image 306 that matches the distinct characteristics of the feature point 308. The feature point 308 and the matching point 310 can be detected using image recognition methods. The methods for detecting the feature point 308 and the matching point 310 will be discussed below.

The physical transformation of the first image 304 and the second image 306 results in movement in the physical world, such as a different picture or a point-of-view in a motion picture, based on the operation of the image processing system 100. The movement of people and objects in the real world can be fed back to the image processing system 100 to further operate the image processing system 100.

The first image 304 is shown requiring a rotational adjustment 312 and a keystone adjustment 314 to properly represent the target 302. The rotational adjustment 312 is the operation of rotating the whole image as displayed the viewing device 106 of FIG. 1. The rotational adjustment 312 can be used to adjust the image taken from a camera that was tilted from the desired orientation or to compensate for the differences between the left-right cameras in 3D applications.

The keystone adjustment 314 is the operation of adjusting the height of the left portion of the image relative to the right portion of the image or vice versa. For example, the keystone adjustment 314 can be used to adjust for the optical disparity in shapes due to horizontal location and filming angles of the capturing device 102 of FIG. 2. Continuing with the example, the keystone adjustment 314 can be used to decrease the height of the right portion of the image while maintaining the height of the left portion of the image constant to adjust for the horizontal angle disparities.

In an alternate embodiment, the keystone adjustment 314 can be the operation of adjusting the width of the top portion of the image relative to the bottom portion of the image or vice versa. For example, the keystone adjustment 314 can be used to adjust for the optical disparity in shapes due to vertical angle of the capturing device 102, such as when the camera is angled upward or downward relative to the target 302. Continuing with the example, the keystone adjustment 314 can be used to decrease the width of the bottom while maintaining the width of the top constant to adjust images taken at an upward angle. For illustrative purposes, the keystone adjustment 314 will be described as the operation of adjusting the effects resulting from the horizontal angles of the capturing device 102. However, it is understood that the keystone adjustment 314 can adjust the effects resulting from horizontal angles, vertical angles, or a combination thereof.

It has been discovered that the present invention provided the image processing system 100 that provide reduced complexity in capturing the image and reduced filming time. The keystone adjustment 314 gives rise to the benefit by eliminating the need to calibrate the capturing device 102. The keystone adjustment 314 can be used to correct for the difference in the alignment or angles between the left and right cameras in 3D filming applications. The keystone adjustment 314 can be used align the images and to create or adjust the perceived depth, distance, viewing location or angle, or a combination thereof when the images are aligned without changing the location or alignment of the cameras. Thus, the capturing device 102 is no longer required to be calibrated to capture the desired 3D effect.

The second image 306 is shown requiring a vertical adjustment 316 and a zoom adjustment 318 to match the first image 304. The vertical adjustment 316 is the operation of adjusting the vertical location of the image relative to the viewing device 106. The vertical adjustment 316 can make the image appear higher or lower on the viewing device 106.

The zoom adjustment 318 is the operation of adjusting the displayed size of the image. The zoom adjustment 318 can change the size of the image displayed on the viewing device 106.

The image adjustor 104 can update the first image 304 and the second image 306 to align vertically the depiction of the target 302 in the two images. After updating, the image adjustor 104 can overlap the first image 304 and the second image 306 to create an aligned image 320. The aligned image 320 is an image of the target 302 that has the second image 306 aligned with the first image 304 or vice versa. For example, the aligned image 320 can be a 3D picture or movie, holographic picture, panoramic picture, or a combination thereof.

For brevity of description in this embodiment of the present invention, the image adjustor 104 will be described as updating and overlapping the first image 304 and the second image 306 and the viewing device 106 showing the aligned image 320. However, it is understood that the image processing system 100 can operate differently. For example, the image processing system 100 can update and overlap the images and show the aligned image 320 on the capturing device 102 or the viewing device 106.

Figure 4:
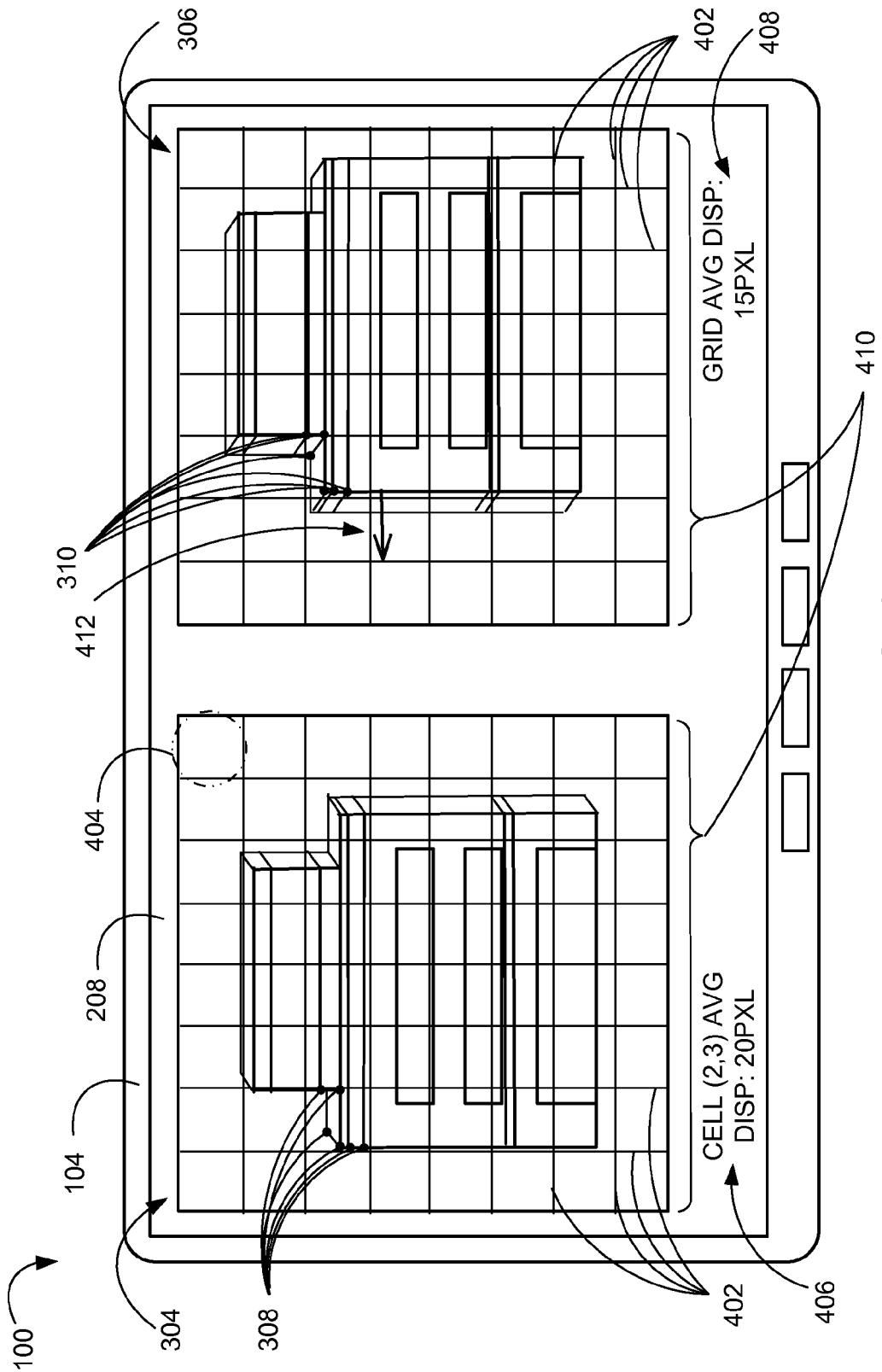
FIG. 4 is a first example of a display interface of the image adjustor.

Referring now to FIG. 4, therein is shown a first example of the display interface 208 on the image adjustor 104. The display interface 208 can show a grid 402 and a grid-cell 404 within the grid 402.

The grid 402 is a framework of crisscrossed bars. The grid 402 can be overlaid on the first image 304, the second image 306, or a combination thereof for dividing the images into equal areas. The grid-cell 404 is the area within the crisscrossed bars. The grid 402 divides the image into a plurality of the grid-cell 404.

The display interface 208 can also show an average in-cell displacement 406 and an average grid displacement 408. The average in-cell displacement 406 is the average of the vertical differences between the plurality of the feature point 308 and the plurality of the matching point 310 within the grid-cell 404. For example, if the grid-cell 404 has a first feature point one pixel higher than the corresponding matching point and a second feature point three pixels higher than the corresponding matching point, the average in-cell displacement 406 can be two pixels.

The average grid displacement 408 is the average of the average in-cell displacement 406 for all of the grid-cells within the grid 402. For example, if the images are divided into four grid-cells, with the grid-cells having one, two, three, and two pixels of the average in-cell displacement 406, respectively, the average grid displacement 408 can be two pixels.

The display interface 208 can also show an image width 410. The image width 410 is the horizontal measurement of the image at the widest portion. The image width 410 can be represented in many ways. For example, the image width 410 can be the number of pixels the image horizontally occupies or the measurement in inches or centimeters or some other unit metric.

As an example, the second image 306 is shown shifted over to the right as compared to the first image 304. The first image 304 and the second image 306 is shown requiring a horizontal adjustment 412. The horizontal adjustment 412 is the operation of adjusting the horizontal location of the image relative to the viewing device 106. The horizontal adjustment 412 can make the image appear further left or right on the viewing device 106 than the original image.

Figure 5:
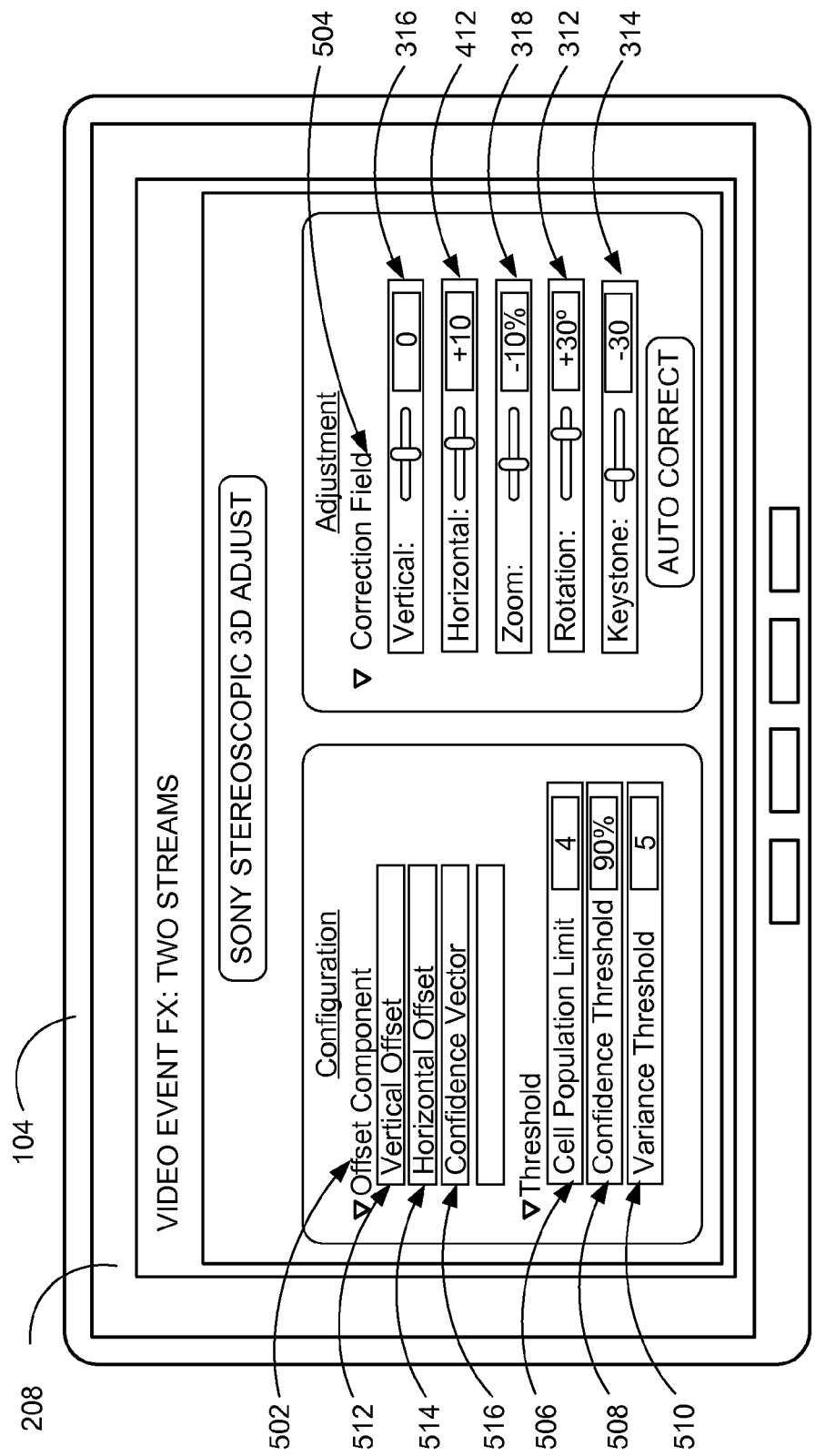
FIG. 5 is a second example of the display interface of the image adjustor.

Referring now to FIG. 5, therein is shown a second example of the display interface 208 on the image adjustor 104. The display interface 208 can show an offset component 502, a correction field 504, a cell population limit 506, a confidence threshold 508, and a variance threshold 510.

The offset component 502 is the difference between images or points. The offset component 502 can indicate the positional differences between the first image 304 of FIG. 3 and the second image 306 of FIG. 3. The offset component 502 can also indicate the positional differences between the feature point 308 of FIG. 3 and the matching point 310 of FIG. 3. The offset component 502 can have a vertical offset 512, a horizontal offset 514, and a confidence vector 516.

The vertical offset 512 is the vertical difference between images or points. The vertical offset 512 can exist when the first image 304 and the second image 306 are not aligned vertically. The vertical offset 512 can also exist when the feature point 308 is higher or lower than the matching point 310.

The vertical offset 512 can have a direction and a magnitude to describe the positional difference. For example, the vertical offset 512 can be positive when the first image 304 is higher than the second image 306 or when the feature point 308 is higher than the matching point 310. Also, for example, the magnitude of the vertical offset 512 can be the number of pixels, distance, such as centimeter or inches, the difference in arbitrary coordinates, or a combination thereof between the feature point 308 and the matching point 310.

For illustrative purposes, the vertical offset 512 will be described as being positive when the matching point 310 is above the feature point 308 and as being negative when the feature point 308 is above the matching point 310. Also, the vertical offset 512 will be described as difference in the number of pixels between the two points. However, it is understood that the vertical offset 512 can be described in a number of different ways as described above.

The horizontal offset 514 is the horizontal difference between images or points. The horizontal offset 514 can exist when the first image 304 and the second image 306 are not aligned horizontally. The horizontal offset 514 can also exist in 3D imaging applications.

The horizontal offset 514 can have a direction and a magnitude to describe the positional difference. For example, the horizontal offset 514 can be a positive value when the second image 306 is further to the right than the first image 304. Also, for example, the magnitude of the horizontal offset 514 can be the number of pixels, distance, such as centimeter or inches, the difference in the predetermined coordinates, or a combination thereof between the feature point 308 and the matching point 310.

The confidence vector 516 provides the likelihood that the feature point 308 and the matching point 310 are the same points on the target 302. The confidence vector 516 can be a percentage or a fraction that represents the correlation between the feature point 308 and the matching point 310. The details regarding the confidence vector 516 will be discussed below.

The correction field 504 is a set of adjustments that can be made to the images. The correction field 504 can have the vertical adjustment 316, the horizontal adjustment 412, the zoom adjustment 318, the rotational adjustment 312, the keystone adjustment 314, or a combination thereof.

For illustrative purposes, the correction field 504 will be shown having the vertical adjustment 316, the horizontal adjustment 412, the zoom adjustment 318, the rotational adjustment 312, and the keystone adjustment 314. However, it is understood that correction field 504 can be different. For example, the correction field 504 can have one or any combination of the listed elements. Also, for example, the correction field 504 can include other operations for adjusting images, such as vertical keystone adjustment or barrel distortion adjustment.

The cell population limit 506 is the minimum requirement for the feature point 308 and the matching point 310 within the grid-cell 404 of FIG. 4 for signifying a dense region in the image. For example, the cell population limit 506 can be set to 4 to require the first image 304 to have 4 or more occurrences of the feature point 308 and the second image 306 to have 4 or more occurrences of the matching point 310 within the grid-cell 404 to be considered dense. The image processing system 100 can compensate for the dense region when the cell population limit 506 has been satisfied. Details regarding the use of the cell population limit 506 will be discussed below.

The confidence threshold 508 is the minimum level required for the confidence vector 516 for the image processing system 100 to adjust and update the images. For example, the confidence threshold 508 can be set to 90% to require at least 90% certainty or higher that the matching point 310 of FIG. 3 corresponds to the feature point 308 of FIG. 3.

The image processing system 100 can use the feature point 308 and the matching point 310 that have the confidence vector 516 greater than or equal to the confidence threshold 508 to adjust and update the images. The detailed use of the confidence threshold 508 will be discussed below.

The variance threshold 510 is the limit for the variance the feature point 308, the matching point 310, or a combination thereof can have from the average in-cell displacement 406. For example, if the variance threshold 510 is set to five pixels, all of the feature points within the grid-cell 404 must be within five pixels of the average in-cell displacement 406. The variance threshold 510 can be used eliminate errant points that may have been identified as the matching point 310 that does not correspond to the feature point 308.

Figure 6:
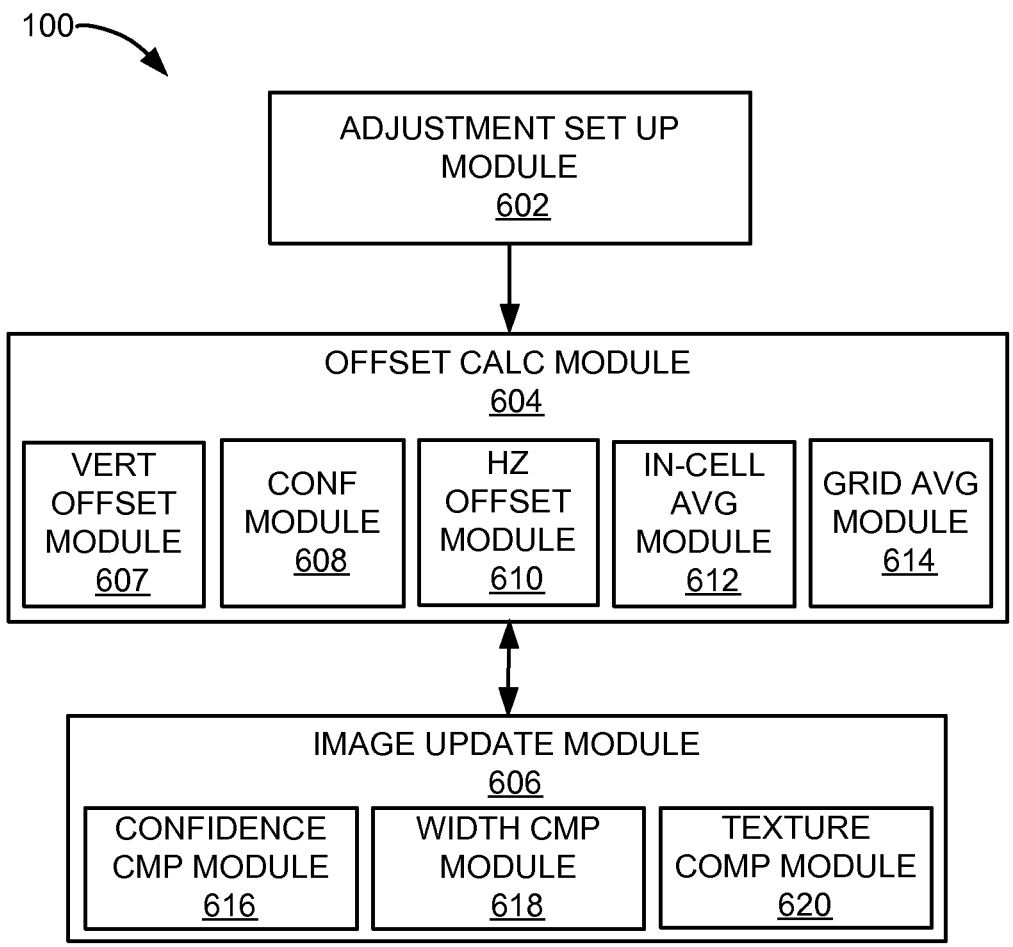
FIG. 6 is a control flow of the image processing system.

Referring now to FIG. 6, therein is shown a control flow of the image processing system 100. The image processing system 100 can include an adjustment set-up module 602, an offset calculation module 604, and an image update module 606. The adjustment set-up module 602 can be coupled to the offset calculation module 604, which can be coupled to the image update module 606.

The purpose of the adjustment set-up module 602 is to identify, determine, and calculate the components necessary for adjusting and updating the first image 304 of FIG. 3 and the second image 306 of FIG. 3. The adjustment set-up module 602 can identify the feature point 308 of FIG. 3 and determine the matching point 310 of FIG. 3. The adjustment set-up module 602 can divide the first image 304 and the second image 306 using the grid 402 of FIG. 4.

The adjustment set-up module 602 can also identify or determine the correction field 504 of FIG. 5, the cell population limit 506 of FIG. 5, the confidence threshold 508 of FIG. 5, and the variance threshold 510 of FIG. 5. The adjustment set-up module 602 can calculate the image width 410 of FIG. 4. The details of the adjustment set-up module 602 will be discussed below.

The purpose of the offset calculation module 604 is to calculate the positional differences between the first image 304 and the second image 306. The offset calculation module 604 can calculate the positional differences by calculating the offset component 502 of FIG. 5 between the feature point 308 and the matching point 310, with the offset component 502 having the vertical offset 512 of FIG. 5. The offset calculation module 604 can have a vertical offset module 607, a confidence module 608, a horizontal offset module 610, an in-cell average module 612, and a grid average module 614.

The offset calculation module 604 can calculate the offset component 502 by receiving the calculated results of the sub-modules within the offset calculation module 604 and associating the results together through methods such as a data structure or a linked list. For example, the offset calculation module can receive the confidence vector 516 of FIG. 5 from the confidence module 608 or the horizontal offset 514 of FIG. 4 from the horizontal offset module 610.

The purpose of vertical offset module 607 is to calculate the vertical offset 512. The vertical offset module 607 can calculate the offset component 502 between the feature point 308 and the matching point 310, with the offset component 502 having the vertical offset 512 of FIG. 5. The vertical offset module 607 can calculate the offset component 502 by calculating the vertical offset 512 and passing the calculated result to the offset calculation module 604.

The vertical offset module 607 can calculate the vertical offset 512 by subtracting the number representing the vertical locations of the feature point 308 from that of the matching point 310. For example, when the feature point 308 is located at (123, 678) and the matching point 310 is located at (456, 779), the vertical offset 512 can be 101, the difference between the vertical values 678 and 779. Also, for example, when the feature point 308 is located at (1, 25) and the matching point 310 is located at (1, 20), the vertical offset 512 can be −5.

The vertical offset module 607 can also receive the updated locations of the feature point 308 and the matching point 310 from the image update module 606. The vertical offset module 607 can use the update locations to recalculate the offset component 502.

It has been discovered that the present invention provided the image processing system 100 that reduce the number of steps in adjusting the images and significantly simplify the operation. The vertical offset 512 and the optimization based on the vertical offset 512 give rise to the benefit by eliminating the requirement to correct other disparity features in the left and right images. The image processing system 100 takes advantage of the fact that minimizing the vertical offset 512 between the left and right images is sufficient for most uses in 3D application.

The offset calculation module 604 can use the control unit 204 of FIG. 2 to subtract the numbers to calculate the vertical offset 512. The offset calculation module 604 can use the control unit 204 and the control interface 210 of FIG. 2 to receive calculated results from other sub-modules to calculate the offset component 502. The offset calculation module 604 can store the offset component 502 in the storage unit 206 of FIG. 2.

The purpose of the confidence module 608 is to calculate the confidence vector 516 between the feature point 308 and the matching point 310. The confidence module 608 can calculate the offset component 502 by calculating the confidence vector 516 and passing the result to the offset calculation module 604.

The confidence module 608 can calculate the confidence vector 516 using the similarity between the characteristics of the feature point 308 and the matching point 310. The confidence module 608 can use characteristics such as color, hue, region surrounding the points, or combination thereof to determine if similarity exists between the points. For example, the confidence module 608 can determine the points match if the individual intensities of the colors making up the pixel for the points are within 10% of each other.

For further example, the confidence module 608 can analyze the area surrounding the points, such as within 5 cm radius or the square area defined by 15 pixels to the left, right, above and below the points. The confidence module 608 can use the edge, line, or shape detecting methods, such as edge detection or corner detection, to determine the context surrounding the feature point 308 and the matching point 310.

Continuing with the example, the confidence module 608 can calculate the differences in the slopes of the edges or the derivative of the outer boundary of the shape or line of the context surrounding the feature point 308 to that of the matching point 310. The confidence vector 516 can be a percentage or a rating, such as from zero to ten with ten being a perfect match, resulting from a method or mathematical function for evaluating the match.

Also, for example, the confidence module 608 can perform two-dimensional convolution by systematically overlaying the feature point 308 and its surrounding region over the matching point 310 and its surrounding region in different positions and calculating the overlapping area. The confidence vector 516 can be the largest amount of overlapped area divided by the total area of the feature point 308.

The confidence vector 516 can be calculated as the offset calculation module 604 calculates the vertical offset 512. Alternatively, the confidence vector 516 can be calculated when identifying the feature point 308 and determining the matching point 310.

The confidence module 608 can also calculate the confidence vector 516 between the feature point 308 and the matching point 310 by calculating the standard error across all occurrences of the feature point 308 and the matching point 310. The confidence module 608 can also calculate the confidence vector 516 using the occurrences of the feature point 308 within each of the grid-cell 404 of FIG. 4 and the corresponding occurrences of the matching point 310. The confidence module 608 can use statistical methods and equations, such as for calculating confidence intervals or standard of deviation, to calculate the confidence vector 516.

The confidence module 608 can use the control unit 204 to calculate the confidence vector 516. The confidence module 608 can access the methods and formulas stored in the storage unit 206 for calculating the confidence vector 516. The confidence module 608 can store the confidence vector 516 for every pair of the feature point 308 and the matching point 310 in the storage unit 206.

The purpose of the horizontal offset module 610 is to calculate the offset component 502 having the horizontal offset 514 between the feature point 308 and the matching point 310. The horizontal offset module 610 can calculate the offset component 502 by calculating the horizontal offset 514 and passing the results to the offset calculation module 604.

The horizontal offset module 610 can calculate the horizontal offset 514 similar to the way the vertical offset module 607 calculates the vertical offset 512. The horizontal offset module 610 can calculate the horizontal offset 514 by subtracting the number representing the horizontal locations of the feature point 308 from that of the matching point 310.

For example, when the feature point 308 is located at (123, 678) and the matching point 310 is located at (456, 779), the horizontal offset 514 can be 333. Also, for example, when the feature point 308 is located at (1, 25) and the matching point 310 is located at (1, 20), the horizontal offset 514 can be 0.

The horizontal offset module 610 can use the control unit 204 to subtract the numbers representing horizontal positions and calculate the horizontal offset 514. The horizontal offset module 610 can store the horizontal offset 514 in the storage unit 206.

The purpose of the in-cell average module 612 is to calculate the average in-cell displacement 406 between a plurality of the vertical offset 512 belonging to a further plurality of the feature point 308 and the matching point 310 within the grid-cell 404. The in-cell average module 612 can calculate the average in-cell displacement 406 by averaging the vertical offset 512 between to the feature point 308 and the matching point 310 within the grid-cell 404.

The in-cell average module 612 can start from the grid-cell 404 on the bottom left of the first image 304 and search to the right then up for the grid-cell 404 containing the feature point 308. The in-cell average module 612 can calculate the average in-cell displacement 406 when the grid-cell 404 contains the feature point 308. The in-cell average module 612 can associate the average in-cell displacement 406 to the grid-cell 404 and store the value, then move on to the next occurrence of the grid-cell 404 until the grid-cell 404 on the upper right of the first image 304.

As an example, the in-cell average module 612 can systematically search and calculate across the grid 402 in different order. For example, the in-cell average module 612 can start from upper left corner of the first image 304 and search down then across until the lower right corner. Also, for example, the in-cell average module 612 can proceed from the center and search in a spiral pattern going clockwise or counter clockwise direction.

When the grid-cell 404 contains singular occurrence of the feature point 308, the in-cell average module 612 can calculate the average in-cell displacement 406 by assigning the value of the vertical offset 512 between the feature point 308 and the matching point 310 to the average in-cell displacement 406. For example, if the grid-cell 404 contains the feature point 308 with the vertical offset 512 of 14 in relation to the matching point 310, the average in-cell displacement 406 can be assigned the value 14 for the grid-cell 404.

When the grid-cell 404 contains more than one occurrence of the feature point 308 within the grid-cell 404, the in-cell average module 612 can average the values of the vertical offset 512 between the occurrences of the feature point 308 and the matching point 310. For example, if the grid-cell 404 contains four instances of the feature point 308, with 2, 3, 4, and −1 as the corresponding vertical offsets, the average in-cell displacement 406 can be 2.

The in-cell average module 612 can use the control unit 204 to search across the grid 402. The order for searching the grid 402 can be stored in the storage unit 206. The in-cell average module 612 can use the control unit 204 to assign or average the vertical offset 512 associated with the grid-cell 404. The in-cell average module 612 can stored the average in-cell displacement 406 in the storage unit 206.

The purpose of the grid average module 614 is to calculate the average grid displacement 408 of FIG. 4 between the plurality of the average in-cell displacement 406 of FIG. 4 from the grid-cell 404. The grid average module 614 can search across the grid 402 in a similar manner to the in-cell average module 612 to find all occurrences of the grid-cell 404 having the average in-cell displacement 406.

The grid average module 614 can average all occurrences of the average in-cell displacement 406 to calculate the average grid displacement 408. For example, if the grid average module 614 finds 5 occurrences of the average in-cell displacement 406 to be 1, 2, 3, 4, and 5, the grid average module 614 can average the numbers and find the average grid displacement 408 to be 5.

It has been discovered that the present invention provided the image processing system 100 that provide aligned images that accurately represent the target 302 of FIG. 3. The average grid displacement 408 gives rise to the benefit by calculating the generalized offset overall, and adjusting and updating the images to minimize the overall offset.

The grid average module 614 can access the average in-cell displacement 406 stored in the storage unit 206 through the storage interface 212. The grid average module 614 can use the control unit 204 to average the occurrences of the average in-cell displacement 406 and calculate the average grid displacement 408. The grid average module 614 can store the average grid displacement 408 in the storage unit 206.

The physical transformation of the offset component 502, such as the different positions of the images in the pictures, results in movement in the physical world, such as the amount and the type of adjustment necessary to align the images or the change in position of the cameras, based on the operation of the image processing system 100. The movement of people and objects in the real world can be fed back to the image processing system 100 to further operate the image processing system 100 to guide the user and adjust the images.

The purpose of the image update module 606 is to update the first image 304 and the second image 306 for minimizing the offset component 502. The image update module 606 can update the images by adjusting the first image 304 and the second image 306 to decrease the offset component 502 between the images.

The image update module 606 can compare the offset component 502 while varying the correction field 504 according to a predetermined pattern, such as that of Particle Swarm Optimization (PSO) or other optimization methods. The image update module 606 can vary the correction field 504 by making the vertical adjustment 316 of FIG. 3, the zoom adjustment of FIG. 3, the rotational adjustment 312 of FIG. 3, the keystone adjustment 314 of FIG. 3, the horizontal adjustment 412 of FIG. 4, or a combination thereof to the first image 304, the second image 306, or a combination thereof.

In using PSO, the image update module 606 can iteratively attempt to improve the offset component 502, particularly the vertical offset 512 or the grid average displacement 408, while moving the plurality of the feature point 308, the matching point 310, or a combination thereof using the correction field 504. The image update module 606 can also use other methods, such as gradient descent or quasi-Newton method to search for the correction field 504 that minimizes the vertical offset 512 or the grid average displacement 408.

The correction field 504 can be adjusted according to patterns and methods of Particle Swarm Optimization, which have not been used before in the field of image adjustment, or other optimization methods. The correction field 504 can also be adjusted according to N-dimensional convolution or other differential methods.

It has been discovered that the present invention provided the image processing system 100 that provide increased applicability. The combination of using the correction field 504 and the grid 402 with PSO gives rise to the benefit by eliminating the necessity for a priori knowledge of the target 302 or the surrounding scene.

The image update module 606 can pass the first image 304 and the second image 306 after the adjustment to the offset calculation module 604 to recalculate the offset component 502 and the average grid displacement 408. The image update module 606 can associate the offset component 502 and the average grid displacement 408 calculated by the offset calculation module 604 to the particular set of adjustments that produced such results.

It has also been discovered that the present invention provided the image processing system 100 that provide simpler and faster operation in that the epipolar geometry of the cameras relative to the scene using a priori knowledge of the scene or structure is not necessary. The combination of using the correction field 504 with PSO gives rise to the benefit by eliminating the need for calculating the geometry, distance, or a combination thereof of the cameras relative to each other or to the scene, or the need for the a priori knowledge of the scene or structure.

It has further been discovered the that present invention provide the image processing system 100 that can correct for the intrinsic differences between cameras and eliminates the requirement for camera calibration. The combination of using the correction field 504 with PSO gives rise to the benefit by eliminating the need to determine the intrinsic differences between the cameras used to capture the scene.

Due to the manufacturing process, the capturing devices have intrinsic differences, such as the distortion of the lens or the sensitivity to certain colors. The image processing system 100 can account for the intrinsic differences between the devices by using the correction field 504 and PSO to calculate the optimal update for the images. Thus, image processing system 100 eliminates the separate determination of the relative differences of the intrinsic qualities between the cameras or the calibration process before capturing the images.

The image update module 606 can compare the offset component 502 and the average grid displacement 408. The image update module 606 can compare the offset component 502 and the average grid displacement 408 using Boolean logic, mathematical evaluations such as greater than, less than, or equal, subtraction, or a combination thereof. The image update module 606 can compare the offset component 502 and the average grid displacement 408 for different combinations of the correction field 504.

The image update module 606 can minimize the average grid displacement 408 by determining the combination of the correction field 504 that has the lowest resulting the offset component 502, the average grid displacement 408, or a combination thereof. The image update module 606 can determine the combination of the correction field 504 that has the lowest resulting the offset component 502 through an iterative process.

The image update module 606 can go through the patterns and combinations of different values or degrees for each adjustment in the correction field 504 in an iterative manner. The image update module 606 can retain the combination of the correction field 504 and the offset component 502, the average grid displacement 408, or a combination thereof.

The image update module 606 can compare the offset component 502, the average grid displacement 408, or a combination thereof of each step in the iteration to the previous step. The image update module 606 can retain the combination of the correction field 504 having the lower results of the offset component 502 and/or the average grid displacement 408. The image update module 606 can update the first image 304, the second image 306, or a combination thereof by adjusting the images according to the combination of the correction field 504 that was retained after each step in the iteration.

The image update module 606 can minimize the offset component 502, the average grid displacement 408, or a combination thereof in other ways. For example, the image update module 606 can calculate the offset component 502, the average grid displacement 408, or a combination thereof for every combination of the correction field 504. The image update module 606 can associate the offset component 502, the average grid displacement 408, or a combination thereof of each combination of the correction field 504 using linked list, database, tables, data structure, or a combination thereof.

Continuing with the example, the image update module 606 can search for the lowest occurrence of the offset component 502, the average grid displacement 408, or a combination thereof. The image update module 606 can update the first image 304, the second image 306, or a combination thereof by adjusting the images according to the combination of the correction field 504 associated with the lowest occurrence of the offset component 502, the average grid displacement 408, or a combination thereof.

The image update module 606 can minimize the offset component 502 belonging to the feature point 308 and the matching point 310 within the variance threshold 510 of the average in-cell displacement 406. The image update module 606 can minimize the offset component 502 by only utilizing the feature point 308 and the matching point 310 that have the confidence vector 516 greater than the variance threshold 510.

The image update module 606 can set a log, such as by assigning a value to a variable or by changing the metadata, the feature point 308 and the matching point 310 that have the confidence vector 516 greater than the variance threshold 510. The image update module 606 can ignore the offset component 502 belonging to the feature point 308 and the matching point 310 that do not have the set flag when minimizing the offset component 502 overall across different adjustments.

Similarly, the offset calculation module 604 can use only the feature point 308 and the matching point 310 having the set flag to calculate the average in-cell displacement 408 and the average grid displacement 408. The image update module can use the resulting the average grid displacement 408 to minimize the average grid displacement 408 across different adjustments.

It has been discovered that the present invention provided the image processing system 100 that provide lower power consumption, faster execution, and requires less resources. The offset component 502 and the average grid displacement 408 give rise to the benefit by limiting the number of parameters used for finding the optimal alignment. The confidence vector 516 and the variance threshold 510 also give rise to the above benefit by only using well matched pairs of the feature point 308 and the matching point 310. The reduction in the variables and the number of points results in using less processing power, reducing the computation time, reducing the amount of memory required, and the power consumed for adjusting the images.

The physical transformation of the correction field 504 results in movement in the physical world, such as people using the image adjustor 104 of FIG. 1 or the repositioning of the capturing device 102 of FIG. 1. The movement of people and objects in the real world can be fed back to the image processing system 100 as the first image 304 and the second image 306 after being adjusted to further operate the image processing system 100 to guide the user and further adjust the images.

The image update module 606 use the control unit 204 to adjust and update the first image 304 and the second image 306. The image update module 606 can store the offset component 502 and the average grid displacement 408 with each combination of the correction field 504. The image update module 606 can store the updated images in the storage unit 206. The image update module 606 can display the updated images on the display interface 208 of FIG. 2.

The image update module 606 can have a confidence comparator module 616, a width comparator module 618, and a texture compensation module 620. The purpose of the confidence comparator module 616 is to compare the confidence vector 516 to the confidence threshold 508. The image update module 606 can use the confidence comparator module 616 in minimizing the offset component 502 belonging to the feature point 308 and the matching point 310 within the variance threshold 510 of the average in-cell displacement 406.

The confidence comparator module 616 can compare the confidence vector 516 to the confidence threshold 508 using Boolean logic, mathematical evaluations such as greater than, less than, or equal, subtraction, or a combination thereof. The confidence comparator module 616 can pass the results of the comparison to the image update module 606.

The confidence comparator module 616 can use the control unit 204 to compare the confidence vector 516 to the confidence threshold 508, both stored in the storage unit 206. The confidence comparator module 616 can store the results of the comparison in the storage unit 206 and pass the results to the image update module 606 using the storage interface 212.

The purpose of the width comparator module 618 is to compare the amount of horizontal offsets between points to the width of the images to determine which points can be used to adjust the images. For example, the width comparator module 618 can adjust the first image 304 having the feature point 308 and the matching point 310 yielding the horizontal offset 514 greater than 1% of the image width 410. The width comparator module 618 can adjust the first image 304, the second image 306, or a combination thereof having the width requirement by comparing the horizontal offset 514 to the image width 410.

The width comparator module 618 can divide the horizontal offset 514 by image width 410, and then multiply the result by 100. The width comparator module 618 can use Boolean logic, mathematical evaluations such as greater than, less than, or equal, subtraction, or a combination thereof to compare the result to 1.

The width comparator module 618 can flag the feature point 308 and the matching point 310 that have the horizontal offset 514 greater than 1% of the image width 410. The width comparator module 618 can pass the results to the image update module 606 and the image update module 606 can ignore the feature point 308 and the matching point 310 that have not been flagged.

The width comparator module 618 can use the control unit 204 to perform the divisions and the comparisons for evaluating the horizontal offset 514 in comparison to the image width 410. The width comparator module 618 can store the results of the comparison in the storage unit 206. The width comparator module 618 can use the storage interface 212 to pass the results to the image update module 606.

The purpose of the texture compensation module 620 is to update the first image 304 having a plurality of the feature point 308 within the grid-cell 404 and the second image 306 having a further plurality of the matching point 310 within the grid-cell 404 exceeding the cell population limit 506. The texture compensation module 620 can update the images meeting the cell population limit 506 requirement by comparing the number of occurrences of the feature point 308 or the matching point 310 within the grid-cell 404.

The texture compensation module 620 can count the occurrences of the feature point 308 or the matching point 310 within the grid-cell 404. The texture compensation module 620 can compare the number of occurrences of the feature point 308 or the matching point 310 within the grid-cell 404 to the cell population limit 506. The texture compensation module 620 can use Boolean logic or other mathematical operations to compare the number of occurrences to the cell population limit 506.

The texture compensation module 620 can make a note regarding the grid-cell 404 when the number of points in the grid-cell 404 exceeds the cell population limit 506 to identify a region dense with feature points and matching points. The texture compensation module 620 can pass the result to the image update module 606. The image update module 606 can only use the average in-cell displacement 406 instead of the offset component 502 to adjust and update the first image 304, the second image 306, or a combination thereof.

When certain regions of the images is dense with a cluster of points, such as plurality of the feature point 308 or the matching point 310 in the grid-cell 404 exceeding the cell population limit 506, the cluster can cause the improper alignment. Giving equal consideration for every point that is within a small region can cause the image alignment system 100 to focus on a small region of an image rather than the overall image. Such misalignment where only a small portion is aligned but the rest of the images are not aligned can be described as being skewed.

The texture compensation module 620 can identify and adjust for the clusters of points. The texture compensation module 620 can use only the average in-cell displacement 406 for the grid-cell 404 having the cluster of points to adjust for the clusters of points.

It has been discovered that the present invention provided the image processing system 100 that provide skew resistant image adjustments based on cluster of points. The cell population limit 506 and the average in-cell displacement 406 give rise to the benefit by defining the areas that have cluster of points that can skew the adjustments and preventing the skewed adjustments.

The texture compensation module 620 can use the control unit 204 to search across the grid 402 and count the occurrences of the feature point 308 or the matching point 310 within the grid-cell 404. The texture compensation module 620 can also use the control unit 204 to compare the number of occurrences to the cell population limit 506. The texture compensation module 620 can store the results of the comparison in the storage unit 206 and pass it to the image update module 606 using the storage interface 212.

Figure 7:
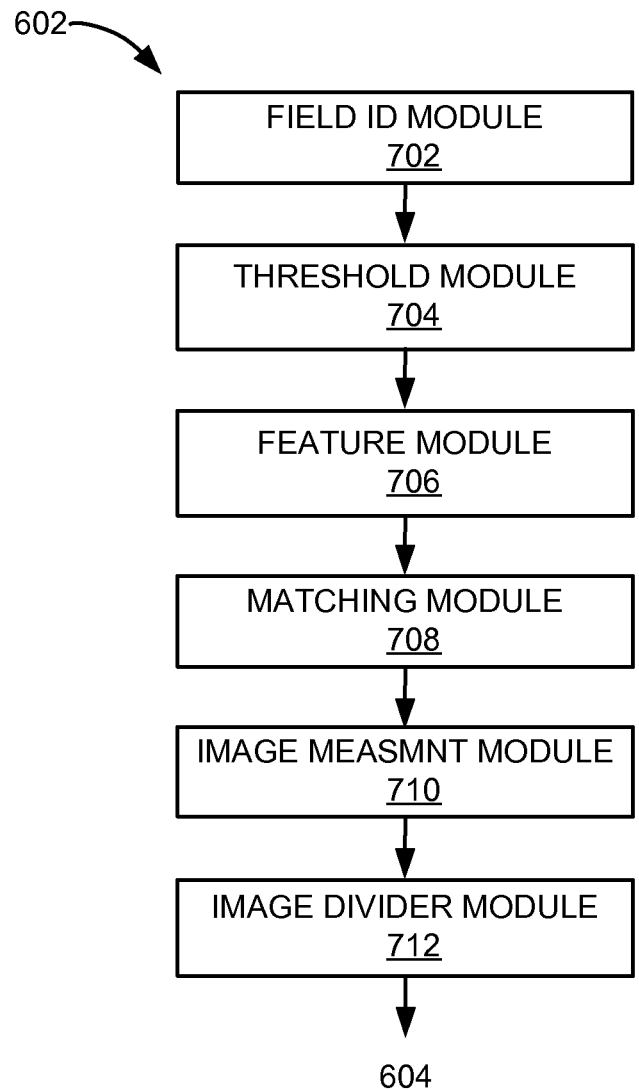
FIG. 7 is a detailed view of the adjustment set-up module of FIG. 6.

Referring now to FIG. 7, therein is shown a detailed view of the adjustment set-up module 602 of FIG. 6. The adjustment set-up module 602 can have a field identification module 702, a threshold module 704, a feature module 706, a matching module 708, an image measurement module 710, and an image divider module 712.

The field identification module 702 can be coupled to the threshold module 704, which can be coupled to the feature module 706. The feature module 706 can be coupled to the matching module 708, which can be coupled to the image measurement module 710. The image measurement module 710 can be coupled to the image divider module 712, which can be coupled to the offset calculation module 604.

The purpose of the field identification module 702 is to identify the correction field 504 of FIG. 5 for adjusting the first image 304 of FIG. 3 and the second image 306 of FIG. 3, with the correction field 504 having the vertical adjustment 316 of FIG. 3, the zoom adjustment 318 of FIG. 3, the rotational adjustment 312 of FIG. 3, and the keystone adjustment 314 of FIG. 3. The field identification module 702 can identify the correction field 504 by selecting the type of adjustment available for the images.

The field identification module 702 can select the types of adjustments by appropriate for the first image 304, the second image 306, or a combination thereof. The field identification module 702 can select from the vertical adjustment 316, the zoom adjustment 318, the rotational adjustment 312, and the keystone adjustment 314.

The field identification module 702 can select the appropriate adjustment based on a predetermined rule or table provided by the image processing system 100. The field identification module 702 can also prompt the user to select the adjustments making up the correction field 504. The field identification module 702 can also have other adjustments, such as horizontal flip, vertical flip, crop, or a combination thereof.

It has been discovered that the present invention provided the image processing system 100 that provide improved usability and familiarity to the user. The correction field 504 and the possible types of adjustments give rise to the benefit by utilizing adjustment types that are commonly known.

The field identification module 702 can use the control unit 204 of FIG. 2 to select the appropriate adjustments to identify the correction field 504. The field identification module 702 can use the predetermined rules or tables stored in the storage interface 212 of FIG. 2 to select the adjustments. The field identification module 702 can also use the display interface 208 of FIG. 2 and the user interface 202 of FIG. 2 to interact with the user in identifying the correction field 504.

The purpose of the threshold module 704 is to identify and determine the various threshold values. The threshold module 704 can identify the cell population limit 506 of FIG. 5 for updating the first image 304, the second image 306, or a combination thereof. The threshold module 704 can identify the cell population limit 506 by using a predetermined formula or look-up table. The threshold module 704 can also prompt the user for input and identify the user's input as the cell population limit 506.

The threshold module 704 can determine the confidence threshold 508 of FIG. 5 for updating the first image 304 and the second image 306. The threshold module 704 can also determine the variance threshold 510 of FIG. 5 for updating the first image 304 and the second image 306.

The confidence threshold 508 and the variance threshold 510 can be determined using a look-up table based on the image size, the image file type, or a combination thereof. The threshold module 704 can also prompt the user for input and identify the user's input as the confidence threshold 508 and the variance threshold 510.

The threshold module 704 can use the control unit 204 to identify the cell population limit 506 and to determine the confidence threshold 508 and the variance threshold 510. The threshold module 704 can use the storage unit 206 to store the cell population limit 506, the confidence threshold 508 and the variance threshold 510.

The purpose of the feature module 706 is to identify the feature point 308 on the first image 304. The feature module 706 can identify the feature point 308 by searching the first image 304 for regions containing contrasting colors, lines, shades, points, or combination thereof. The feature module 706 can use methods such as edge detection or differential algorithm to identify the feature point 308 on the first image 304.

The purpose of the matching module 708 is to determine the matching point 310 on the second image 306 with the matching point 310 corresponding to the feature point 308. The matching module 708 can determine the matching point 310 by identify points of interest in the same way as the feature module 706 identifies the feature point 308. The matching module 708 can compare the identified points of interest to the feature point 308.

The matching module 708 can determine the point of interest as the matching point 310 when the two meet a predetermined rule or formula. The matching module 708 can use pattern recognition or content based image retrieval methods to determine the matching point 310.

The feature module 706 and the matching module 708 can use the control unit to identify the feature point 308 and determine the matching point 310. The feature module and the matching module 708 can store the feature point 308 and the matching point 310 in the storage unit 206.

The purpose of the image measurement module 710 is for calculating the image width 410 of FIG. 5 of the first image 304 and the second image 306 for updating the first image 304 and the second image 306. The image measurement module 710 can calculate the image width 410 by counting the number of pixels horizontally across the first image 304 and the second image 306.

The image measurement module 710 can also use predetermined formulas or references to calculate the image width 410. The image measurement module 710 can assign the larger of the two width measurements between the first image 304 and the second image 306 as the image width 410.

The image measurement module 710 can use the control unit 204 to calculate the image width 410. The image measurement module 710 can access the predetermined formulas or references stored in the storage unit 206. The image measurement module 710 can store the image width 410 in the storage unit 206 and use the storage interface 212 to pass the values to other modules.

The purpose of the image divider module 712 is to divide the first image 304 and the second image 306 using the grid 402 of FIG. 5 with the grid 402 having at least the grid-cell 404 of FIG. 5. The image divider module 712 can divide the images by overlaying horizontal lines and vertical lines evenly spaced out.

For example, the image divider module 712 can overlay the lines for the grid 402 every 100 pixels or every 3 centimeters on the images. The image divider module 712 can identify the portions of the images surrounded by the edge of the image, by the overlaid lines as the grid-cell 404, or a combination thereof.

The image divider module 712 can overlay the lines on the display interface 208 for the user to see. The image divider module 712 can also overlay clear lines so that the grid can only be recognized by the image processing system 100 and not the user.

It has been discovered that the present invention provided the image processing system 100 that provide improved applicability and usability. The grid 402 gives rise to the benefit by generating an adaptable reference points and divisions and not requiring the user to incorporate a known object or reference points, such as a chessboard pattern.

The image divider module 712 can use the control unit 204 to overlay the lines and divide the images with the grid 402. The image divider module 712 can access the predetermined spacing for the lines for dividing the images from the storage unit 206. The image divider module 712 can stored the divided images and the grid 402 in the storage unit 206.

The image processing system 100 can be partitioned between the capturing device 102 of FIG. 1, the image adjustor 104 of FIG. 1, and the viewing device 106 of FIG. 1. For example, the image processing system 100 can be partition into the capturing device 102, the image adjustor 104, and the viewing device 106, or a combination thereof. The adjustment set-up module 602 of FIG. 6 can be on the capturing device 102 and the offset calculation module 604 of FIG. 6 can be on the image adjustor 104. The image update module 606 can be on the viewing device 106. Also, for example, all of the functional modules can exist solely on the capturing device 102, the image adjustor 104, or the viewing device 106.

The image processing system 100 can also be implemented as additional functional units in the capturing device 102, the image adjustor 104, and the viewing device 106, or a combination thereof. For example, the texture compensation module 620 of FIG. 6 can be an additional functional unit in the image adjustor 104 and the adjustment set-up module 602 can be additional functional unit in the capturing device 102.

Figure 8:
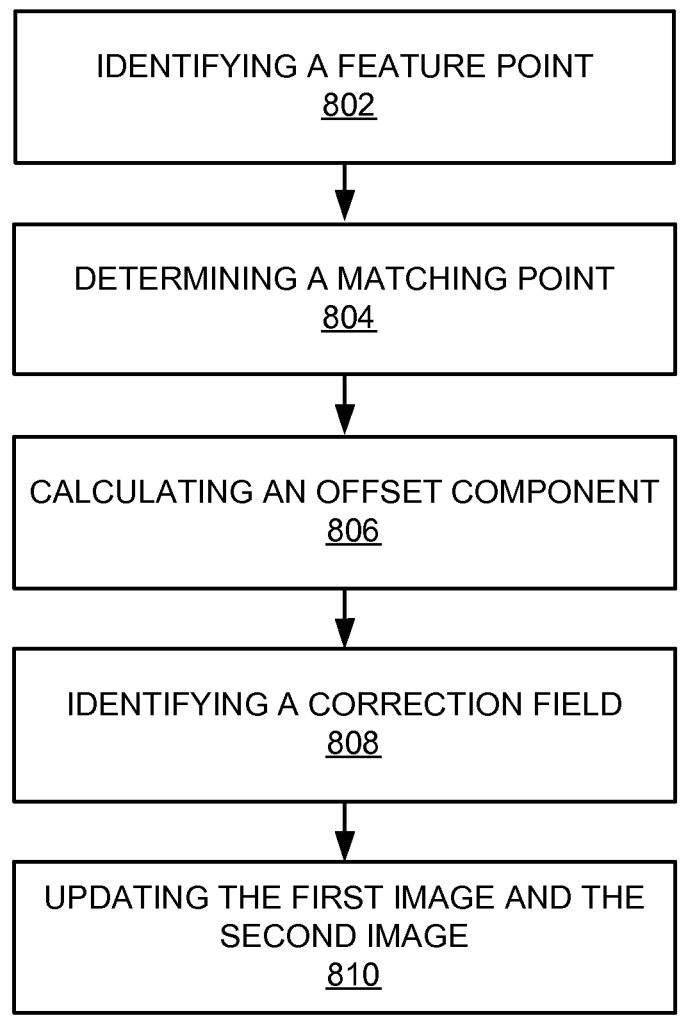
FIG. 8 is a flow chart of a method of operation of the image processing system in a further embodiment of the present invention.

Referring now to FIG. 8, therein is shown a flow chart of a method 800 of operation of the image processing system 100 in a further embodiment of the present invention. The method 800 includes: identifying a feature point on a first image in a block 802; determining a matching point on a second image with the matching point corresponding to the feature point in a block 804; calculating an offset component between the feature point and the matching point with the offset component having a vertical offset in a block 806; identifying a correction field for updating the first image and the second image, with the correction field having a vertical adjustment, a zoom adjustment, a rotational adjustment, and a keystone adjustment in a block 808; and updating the first image and the second image using the correction field for minimizing the offset component for displaying an aligned image on a device in a block 810.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an image processing system comprising:
   identifying a feature point on a first image;
   determining a matching point on a second image with the matching point corresponding to the feature point;
   calculating an offset component between the feature point and the matching point with the offset component having a vertical offset;
   identifying a correction field for updating the first image and the second image, with the correction field having a vertical adjustment, a zoom adjustment, a rotational adjustment, a keystone adjustment, or a combination thereof;
   updating the first image and the second image using the correction field for minimizing the offset component for displaying an aligned image on a device;
   calculating an average in-cell displacement between a plurality of the vertical offset belonging to a further plurality of the feature point and the matching point within a grid-cell; and
   calculating an average grid displacement between the plurality of the average in-cell displacement from the grid-cell; and
   wherein:
   updating the first image and the second image includes minimizing the average grid displacement.

2. The method as claimed in claim 1 further comprising:
   dividing the first image using a grid having the grid-cell;
   identifying a cell population limit for updating the first image; and
   wherein:
   updating the first image includes updating the first image having a plurality of the feature point within the grid-cell exceeding the cell population limit.

3. The method as claimed in claim 1 further comprising:
dividing the second image using a grid having the grid-cell;
identifying a cell population limit for updating the second image; and
wherein:
updating the second image includes updating the second image having a plurality of the matching point within the grid-cell exceeding the cell population limit.

4. The method as claimed in claim 1 further comprising:
determining a confidence threshold for updating the first image; and
wherein:
calculating the offset component includes calculating a confidence vector between the feature point and the matching point; and
updating the first image and the second includes comparing the confidence vector to the confidence threshold.

5. The method as claimed in claim 1 wherein identifying the correction field includes comparing the offset component while varying the correction field.

6. A method of operation of an image processing system comprising:
identifying a feature point on a first image;
determining a confidence threshold for updating the first image;
determining a matching point on a second image, with the matching point corresponding to the feature point;
dividing the first image and the second image using a grid having a grid-cell;
identifying a cell population limit for updating the first image and the second image;
calculating an offset component between the feature point and the matching point, with the offset component having a vertical offset and a confidence vector;
identifying a correction field for adjusting the first image and the second image, with the correction field having a vertical adjustment, a zoom adjustment, a rotational adjustment, a keystone adjustment, or a combination thereof;
updating the first image and the second image for minimizing the offset component and the confidence vector is greater than the confidence threshold, with the first image having a plurality of the feature point within the grid-cell and the second image having a further plurality of the matching point within the grid-cell, both pluralities exceeding the cell population limit;
calculating an average in-cell displacement between a plurality of the vertical offset belonging to a further plurality of the feature point and the matching point within the grid-cell; and
calculating an average grid displacement between a plurality of the average in-cell displacement from the grid-cell; and
wherein:
updating the first image and the second image includes minimizing the average grid displacement.

7. The method as claimed in claim 6 further comprising:
determining a variance threshold for updating the first image and the second image; and
wherein:
updating the first image and the second image includes minimizing the offset component belonging to the feature point and the matching point within the variance threshold of the average in-cell displacement.

8. The method as claimed in claim 6 further comprising:
calculating an image width of the first image for updating the first image; and wherein:
calculating the offset component includes calculating a horizontal offset between the feature point and the matching point; and
updating the first image includes adjusting the first image having the feature point yielding the horizontal offset greater than 1% of the image width.

9. The method as claimed in claim 6 further comprising:
calculating an image width of the second image for updating the second image and the second image; and
wherein:
calculating the offset component includes calculating a horizontal offset between the feature point and the matching point; and
updating the second image includes adjusting the second image having the matching point yielding the horizontal offset greater than 1% of the image width.

10. An image processing system comprising:
a feature module for identifying a feature point on a first image;
a matching module, coupled to the feature module, for determining a matching point on a second image, with the matching point corresponding to the feature point;
an offset calculation module, coupled to the matching module, for calculating an offset component between the feature point and the matching point, with the offset component having a vertical offset;
a field identification module, coupled to the offset calculation module, for identifying a correction field for adjusting the first image and the second image, with the correction field having a vertical adjustment, a zoom adjustment, a rotational adjustment, a keystone adjustment, or a combination thereof;
an image update module, coupled to the field identification module, for updating the first image and the second image for minimizing the offset component for displaying an aligned image on a device;
a threshold module, coupled to the image update module, for determining a confidence threshold and a cell population limit for updating the first image and the second image;
an image divider module, coupled to the matching module, for dividing the first image and the second image using a grid having a grid-cell;
a texture compensation module, coupled to the image update module, for updating the first image having a plurality of the feature point within the grid-cell and second image having a further plurality of the matching point within the grid-cell exceeding the cell population limit;
a confidence module, coupled to the offset calculation module, for calculating the offset component having a confidence vector between the feature point and the matching point;
a confidence comparator module, coupled to the confidence module, for comparing the confidence vector to the confidence threshold;
an in-cell average module, coupled to the image update module, calculating an average in-cell displacement between a plurality of the vertical offset belonging to a further plurality of the feature point and the matching point within the grid-cell; and
a grid average module, coupled to the in-cell average module, for calculating an average grid displacement between the plurality of the average in-cell displacement from the grid-cell; and wherein:
the image update module is for minimizing the average grid displacement.

11. The system as claimed in claim 10 wherein the image update module is for comparing the offset component while varying the correction field.

12. The system as claimed in claim 10 wherein:
the threshold module is for determining a variance threshold for updating the first image and the second image; and
the image update module is for minimizing the offset component belonging to the feature point and the matching point within the variance threshold of the average in-cell displacement.

13. The system as claimed in claim 10 further comprising:
an image measurement module, coupled to the feature module, for calculating an image width of the first image for updating the first image;
a horizontal offset module, coupled to the calculation module, for calculating a horizontal offset between the feature point and the matching point; and
a width comparator module, coupled to the horizontal offset module, for adjusting the first image having the feature point yielding the horizontal offset greater than 1% of the image width.

14. The system as claimed in claim 10 further comprising:
an image measurement module, coupled to the feature module, for calculating an image width of the second image for updating the second image;
a horizontal offset module, coupled to the calculation module, for calculating a horizontal offset between the feature point and the matching point; and
a width comparator module, coupled to the horizontal offset module, for adjusting the second image having the matching point yielding the horizontal offset greater than 1% of the image width.

* * * * *